US010546029B2

(12) United States Patent
Devries

(10) Patent No.: US 10,546,029 B2
(45) Date of Patent: Jan. 28, 2020

(54) METHOD AND SYSTEM OF RECURSIVE SEARCH PROCESS OF SELECTABLE WEB-PAGE ELEMENTS OF COMPOSITE WEB PAGE ELEMENTS WITH AN ANNOTATING PROXY SERVER

(71) Applicant: Derek A. Devries, San Francisco, CA (US)

(72) Inventor: Derek A. Devries, San Francisco, CA (US)

(*) Notice: Subject to any disclaimer, the term of this patent is extended or adjusted under 35 U.S.C. 154(b) by 0 days.

(21) Appl. No.: 14/995,039

(22) Filed: Jan. 13, 2016

(65) Prior Publication Data

US 2018/0300412 A1    Oct. 18, 2018

(51) Int. Cl.
*G06F 16/00* (2019.01)
*G06F 16/9535* (2019.01)
*G06F 16/958* (2019.01)
*G06F 16/2457* (2019.01)

(52) U.S. Cl.
CPC .... *G06F 16/9535* (2019.01); *G06F 16/24578* (2019.01); *G06F 16/958* (2019.01)

(58) Field of Classification Search
CPC ........... G06F 17/30867; G06F 17/3053; G06F 17/3089; G06F 16/9535; G06F 16/958; G06F 16/24578

(Continued)

(56) References Cited

U.S. PATENT DOCUMENTS 9,946,693 B2 * 4/2018 Jin ...................... G06F 3/04817
2007/0011355 A1 * 1/2007 Levenberg .......... H04L 67/2828
709/246

(Continued)

*Primary Examiner* — Thanh-Ha Dang

(57) ABSTRACT

In one embodiment, a method detects that a web browser of a user has accessed an annotated webpage. The annotated webpage comprises one or more webpage elements comprising a set of selectable portions. The method detects that a user has utilized a user input system to select a selectable portion of a web-page element. The method identifies the selectable portion of the web-page element. The method generates a list of identifiers based on the identity of the selectable portion. With the list of identifiers, the method searches a database of annotated web-page elements managed by the proxy server system. The method retrieves a set of returned annotated web-page elements from the database. The method assigns a similarity score to each returned annotated web-page element. The similarity score is based on a similarity of the selectable web-page element with a respective returned annotated web-page element. The method ranks each returned web-page elements based the similarity score. The method creates a deck of ranked-returned web-page elements. The method presents the deck of ranked-returned web-page element to the web browser of the user. Each ranked-returned web-page element comprises another set of selectable portions. The method detect that the user has utilized the user input system to select another selectable portion of the ranked-returned web-page element. The method identifies the other selectable portion of the ranked-returned web-page element. The method generates another list of identifiers based on the other selectable portion's identity. The method updates the list of identifiers with the other list of identifiers. The method reassigns a similarity score to each returned annotated web-page element. The method re-ranks each returned web-page elements based the similarity score. The method re-creates the deck of ranked-returned web-page elements.

16 Claims, 13 Drawing Sheets

(58) Field of Classification Search
USPC .......................................................... 707/728
See application file for complete search history.

(56) References Cited

U.S. PATENT DOCUMENTS

| | | | |
|---|---|---|---|
| 2009/0089326 A1* | 4/2009 | Balasubramanian | ........................ G06F 16/958 |
| 2009/0199083 A1* | 8/2009 | Sar | ....................... G06F 16/9558 715/231 |
| 2009/0307215 A1* | 12/2009 | Ball | ..................... G06F 16/9535 |
| 2009/0327855 A1* | 12/2009 | Le | ....................... G06F 16/9558 715/230 |
| 2010/0011282 A1* | 1/2010 | Dollard | ................. G06F 17/241 715/233 |
| 2011/0283232 A1* | 11/2011 | Jordan | ............... H04N 5/44543 715/810 |
| 2011/0289419 A1* | 11/2011 | Yu | ....................... G06F 9/44526 715/738 |
| 2013/0198641 A1* | 8/2013 | Brownlow | ............ G06F 3/0485 715/738 |
| 2014/0280297 A1* | 9/2014 | Gulli | ................... G06F 16/3322 707/769 |
| 2017/0116291 A1* | 4/2017 | Sunny | ..................... H04L 67/10 |

* cited by examiner

METHOD AND SYSTEM OF RECURSIVE SEARCH PROCESS OF SELECTABLE WEB-PAGE ELEMENTS OF COMPOSITE WEB PAGE ELEMENTS WITH AN ANNOTATING PROXY SERVER

BACKGROUND OF THE INVENTION

1. Field

This application relates generally web browsing and proxy servers, and more particularly to a system and method of recursive search process of selectable web-page elements of composite web page elements with an annotating proxy server.

2. Related Art

Web applications have become increasingly popular as a result of their flexibility of deployment and their relatively intuitive interfaces. Moreover, online social networks have expanded the ability of end user of the Internet to interact with each other and share information. In a conventional online social networking experience, a user logins and can view activities of friends on webpages that have been formatted and designed by the online social network administrator. If the online social network experience occurs on a web page that is not controlled by the online social network, it can be relegated to a specified location in the web page such as a discussion section of the web page. Users are not able to share information with other users (such as social network connections) regarding other elements of the web page and have this information integrated into the other elements.

Thus, a method and system are desired for a system and method of generating composite web page elements with annotating proxy server to improve beyond existing methods of sharing information across the Internet.

BRIEF SUMMARY OF THE INVENTION

In one embodiment, a method detects that a web browser of a use has accessed an annotated webpage. The annotated webpage comprises one or more webpage elements comprising a set of selectable portions. The method detects that a user has utilized a user input system to select a selectable portion of a web-page element. The method identifies the selectable portion of the web-page element. The method generates a list of identifiers based on the identity of the selectable portion. With the list of identifiers, the method searches a database of annotated web-page elements managed by the proxy server system. The method retrieves a set of returned annotated web-page elements from the database. The method assigns a similarity score to each returned annotated web-page element. The similarity score is based on a similarity of the selectable web-page element with a respective returned annotated web-page element. The method ranks each of the returned web-page elements based the similarity score. The method creates a deck of ranked-returned web-page elements. The method presents the deck of ranked-returned web-page element to the web browser of the user. Each ranked-returned web-page element comprises another set of selectable portions. The method detects that the user has utilized the user input system to select another selectable portion of the ranked-returned web-page element. The method identifies the other selectable portion of the ranked-returned web-page element. The method generates another list of identifiers based on the other selectable portion's identity. The method updates the list of identifiers with the other list of identifiers. The method reassigns a similarity score to each returned annotated web-page element. The method re-ranks each returned web-page elements based the similarity score. The method re-creates the deck of ranked-returned web-page elements.

BRIEF DESCRIPTION OF THE DRAWINGS

The present application can be best understood by reference to the following description taken in conjunction with the accompanying figures, in which like parts may be referred to by like numerals.

DETAILED DESCRIPTION OF THE INVENTION

Figure 1:
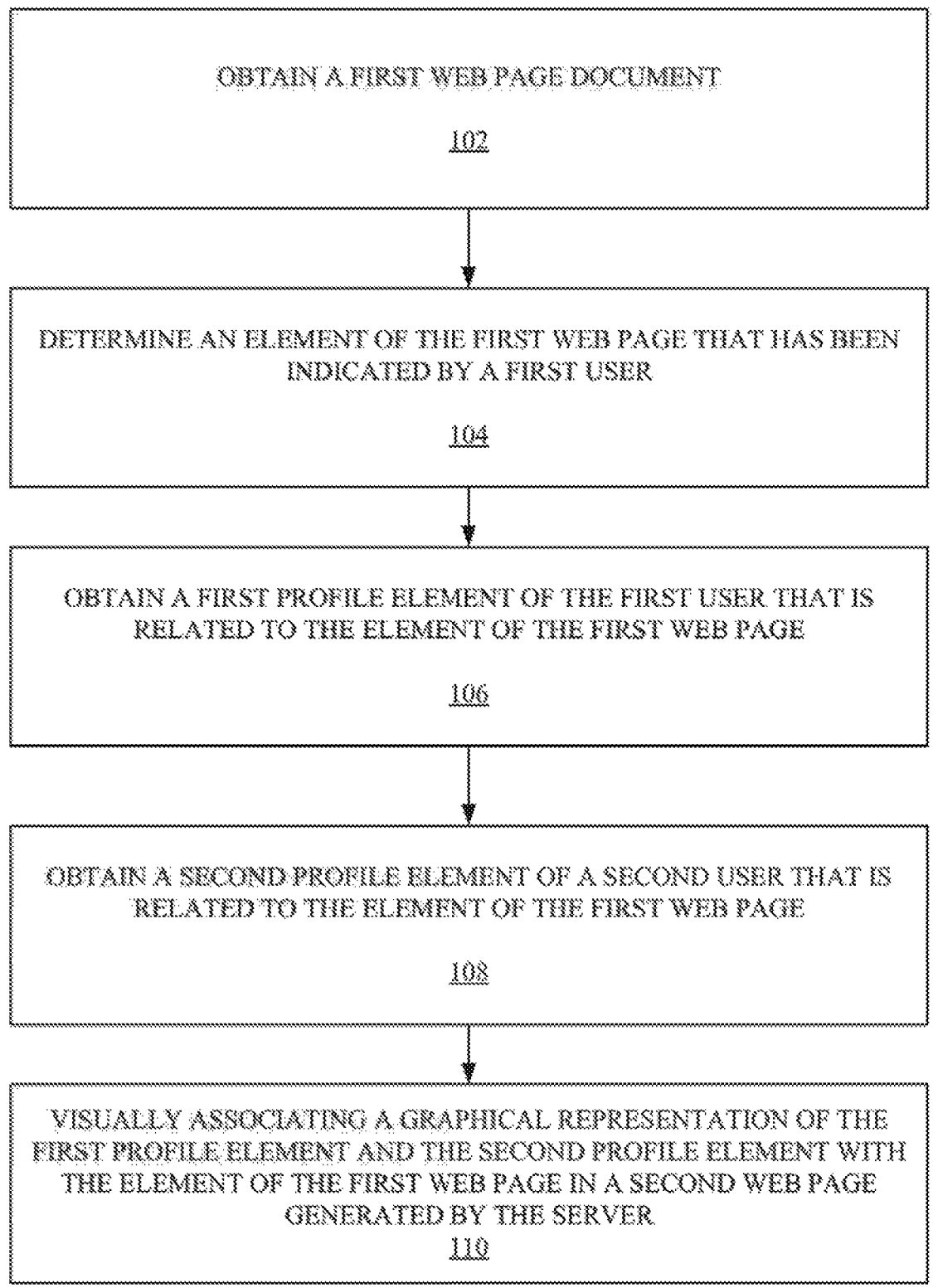
FIG. 1 illustrates an exemplary process for a system and method of generating composite web page elements with annotating proxy server.

Disclosed are a system, method, and article of manufacture of recursive search process of selectable web-page elements of composite web page elements with an annotating proxy server. The following description is presented to enable a person of ordinary skill in the art to make and use the various embodiments. Descriptions of specific devices, techniques and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, stricture, characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and, labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Object recognition can be a computer vision method of finding and identifying objects in a digital image and/or video sequence.

Proxy server can be a server (e.g. a computer system or an application) that acts as an intermediary for requests from clients seeking resources from other servers. A client can connect to the proxy server, requesting some service, such as a file, connection, web page, and/or other resource available from a different server and the proxy server evaluates the request as a way to simplify and control its complexity.

Recommendation engine (e.g. a recommender system) can be a tool that lets algorithm developers predict what a user may or may not like among a list of given items.

Web page can be a web document that is suitable for the World Wide Web and the web browser.

Web browser can display a web page on a monitor or mobile device. The web page can be what displays, but the term also refers to a computer file, usually written in HTML or comparable markup language. A web browser can coordinate the various web resource elements for the written web page, such as style sheets, scripts and images, to present the web page Process Overview A user can access a web page. For example, a user can use a web browser operating in a computing system communicatively coupled with a computer network and/or an application browser (e.g. as part of a mobile-device application) to access a web page. The user can access the web page via a proxy server.

It is noted that virtual-reality (VR) environment elements, augmented-reality elements, etc. can be accessed in lieu of a web page in some example embodiments. The web page can include digital images and/or text. A user can select and/or move other graphical user interface elements (e.g. a pointer, a region of a touch-screen, body-position sensor wearables that enable a user to interact with VR elements, etc.). This information can be communicated to the proxy server. In this way, the proxy server can monitor the user's interactions with the web page and the various web-page elements. The web page and/or web-page elements can be associated with annotations (e.g. user comments/webpage annotations). FIGS. 1-4 provide various methods of web-page annotations that can be utilized herein.

A user can select a portion of a web-page element. The proxy server can identify the portion of the selected web-page element. The proxy server can then generate a list of identifiers of the selected web-page element. This list of identifiers can be obtained via various methods including, inter alia: computer vision, image identification algorithms, annotation/comment content, the identity of other web-page elements that are proximate to the selected web-page content, the identity of other web-page elements that are referring to the selected web-page content, past user search history, user location, other user attributes, etc.

In some example embodiments, identifiers can be proximate to the image. The proxy server can utilize identifiers that are proximate to the image. In other example embodiments, the identifiers can be on other websites managed by the proxy server. example, the proxy server can identify other websites that are similar in content to the present website. For example, website content used to determine similarity can include an original website content, website annotations, etc. In another example, the proxy server can identify other images on other websites that it manages that are similar in content to the image identified in the portion of the selected web-page element.

The proxy server can use the list of identifiers search a database of other annotations and/or annotated web-page elements (e.g. digital images, text elements, digital video, VR elements, etc.). The other annotations and/or annotated web-page element can be obtained from other web pages accessible by the proxy server. The proxy server can then determine attributes of the returned web-page elements that are similar to the user selected-portion of the web-page element. The proxy server can rank the returned web-page elements based on various factors such as, inter alia: similarity to the user selected-portion of the web-page element, user attributes, user search history, user location, popularity of annotations by other users, etc.

The proxy server can obtain files/documents that contain the web-page elements (e.g. portions of a web page, digital image, video file, portion of a text documents, etc.). The proxy server can generate a deck of ranked web-page elements.

The deck of ranked web-page elements can be presented to the user (e.g. as a series of slides each slide including a ranked web-page element that can be search by having a portion selected, etc.). For example, the currently viewed web page can be modified to include the deck of ranked web-page elements. The deck of ranked web-page elements can be navigable by the user. For example, a user can scroll through the deck of ranked web-page elements. A user can then select a portion of a particular slide in the deck of ranked web-page elements.

Example Annotation System Processes

FIG. 1 illustrates an exemplary process 100 fora system and method of generating composite web page elements with annotating proxy server. Regarding FIGS. 1-4, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with some embodiments, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with some embodiments.

In step 102 of process 100, a web page document is obtained and parsed with a server (e.g. a proxy server). For example, a personal computing device can include a web browser. The web browser can be connected with a computer network such as the Internet. The web browser can request a proxy server (e.g. a server (a computer system or an application) that acts as an intermediary for requests from clients seeking resources from other servers) obtain and parse the web page document. In step 104, an element of the first page that has been indicated by a first user is determined. For example, the first user can view the first web page on a personal computing device with a web browser and display. The user can use a user input device (key board, mouse pointer and the like) to indicate an element of the web page document that is displayed with the web browser. In step 106, a first profile element of the first user that is related to the element of the web page is obtained. For example, a profile of a user can be maintained. The profile can include such information as personal user information, user web browsing history as well as HTML code and other web page elements of web pages provided to the user within a specified period of time (as well as other webpage elements indicated by the user previously), user social networking data, user comments/webpage annotations, user-provided media (images, videos, audio and the like), user computer-enabled drawings (e.g. with a computerized drawing tool), any user interaction with a web page via the annotating server, etc. Recent profile information can be stored in a cache. Optionally, the proxy server can include a module for generating a graphical representation of profile data (e.g. as a user avatar, an element of a user avatar, in a human and/or animal form, etc.). This graphical representation can be formatted for integration into a web page document that can include all or relevant portions of the first web page document. Similarly, in step 108, a second profile element of the second user that is related to the element of the web page is obtained. The second user can be anyone whose profile information has been acquired by the system described herein. For example, the second user can be connected to the first user in a social network. Similarly, the second user can have previously visited the first web page via the proxy server and indicated the element of the first web page. For example the second user can have tagged (i.e. annotated) the element with a user comment, user-generated instruction to subsequent visitors, hyperlinks to other web pages and the like. The proxy server can also include a module that filters candidates for the second user from other members as well as filters annotations by other users of the proxy server according to specified criteria (similar recent web browsing history, connected (explicitly and/or implicitly) in a social network, similar profile features, and the like). Optionally, the profile information of a plurality of other uses can be selected according specified parameters. Again, this information can be translated into a graphical representation for display with the web page and association with the web page element. In step 108, the graphical representation of the first element and the second element are visually associated with the element of the first web page. In various embodiments, the display the graphical representation of the user profile information can include such methods as integration of the graphical representation into a second web page document, provision of a widget that overlays the display of the first web page with a web browser and the like. Furthermore, the graphical representation can include elements of that are obtained from the first website (e.g. graphical representations of themes, subject matter, corporate proprietors of the first website, etc.). A proxy server can perform process 100.

Optionally, users of the proxy server system can also annotate elements of web pages obtained through the proxy server system. These annotates can include user comments, user-provided media, hyperlinks, modifications of web page elements and the like. These annotations can be stored in the user's profile for later user as a user profile element.

Annotations can be implemented as a small application (e.g. web widget) that can be installed and executed within a web page by the annotating proxy server. The web widget can be integrated into the design of the indicated element of the first web page as well. Optionally, as users whose profile information is included in the web widget perform other operations (e.g. viewing other related web pages, annotating related web pages, leaving annotations on other web pages and the like) with the proxy server, the concomitant user profile information can be updated. In turn, the information in the web widget can also be updated by the annotating proxy server (e.g. in substantially real time assuming system latency).

Figure 2:
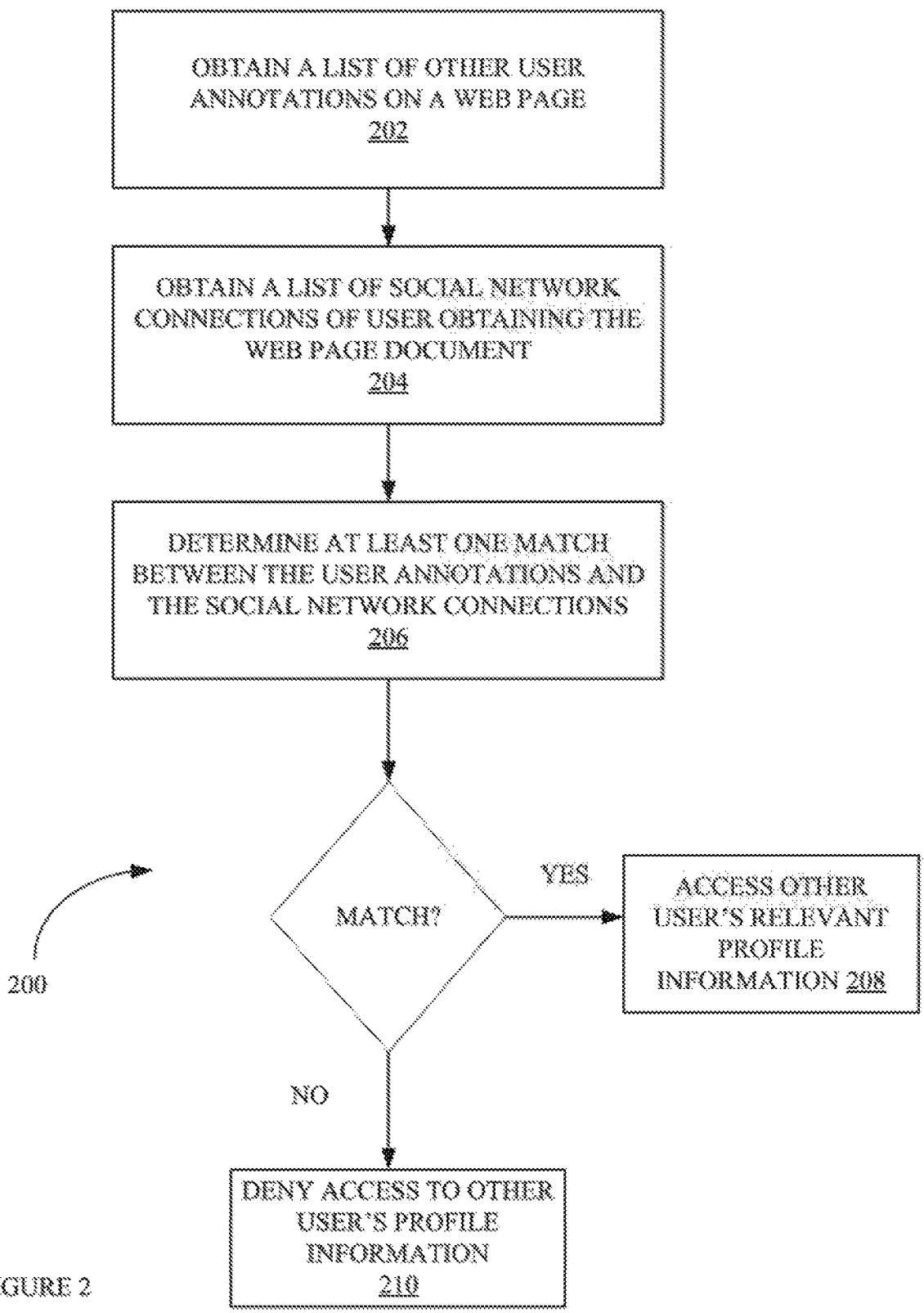
FIG. 2 illustrates an example process of filtering user profile data or integration by an annotating proxy server into a composite web page document.

FIG. 2 illustrates an example process 200 of filtering user profile data for integration by an annotating proxy server into a composite web page document. In step 202 of process 202, a list of web page annotations of a web page is obtained by the annotating proxy server. For example, a user may utilize the annotating proxy server to access a particular web page. The annotating proxy server can obtain the web page document. The annotating proxy server can then determine if other users have provided the annotating proxy server annotations for elements of the web page. If the other annotations are located (e.g. in a database accessed by the annotating proxy server), the annotating proxy server can then obtain the annotations and the users who provided the annotations. In step 205, a list of the social networking connections (e.g. either explicit and/or implicit connections) is obtained by the proxy server. For example, the annotating proxy server can maintain and manage a computerized social network. Users can become 'friends' with each other and thus form connections in the social network. Other social networks can be implicit and formed based on certain user attributes. The annotating proxy server can include a social networking module that manages social networks. In step 206, the annotating proxy server can determine if a match exists between the list of users that provided user annotations and the social networking connections of the user utilizing the annotating proxy server to obtain the web page document. If a match if determined, in step 208 the annotating proxy server can access the profile information of the matched users. This profile information can be integrated by the annotating proxy server into another web page document that includes both the requested web page, the requesting user's profile information and/or the matching user's profile information. The annotating proxy server can formation this information for integration into the generated web page.

Figure 3:
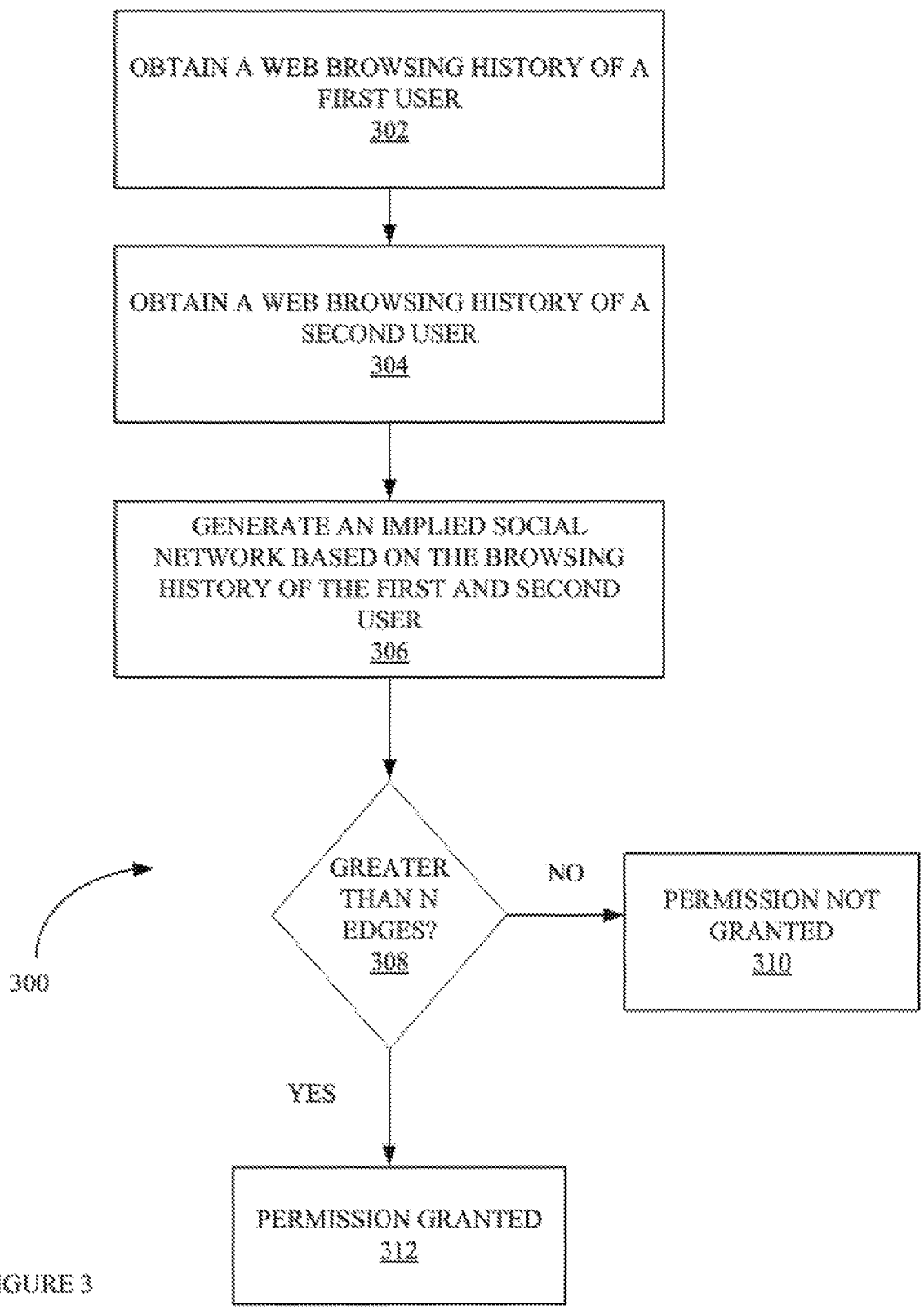
FIG. 3 illustrates another example process of filtering user profile data for integration by an annotating proxy server into a composite web page document.

FIG. 3 illustrates another example process 300 of filtering user profile data for integration by an annotating proxy server into a composite web page document. In step 302 of process 300, the annotating proxy server can obtain a web history of a first user. For example, annotating proxy server can maintain a web browsing history of each user that navigates the Internet and/or other computer network utilizing the annotating proxy server. In another example, the annotating proxy server can query and receive the web browsing history from a web browser of a computing device of the first user. In step 302, the annotating proxy server can obtain a web browsing history of a second user. In step 304, the annotating proxy server can generate an implied social network based on the browsing history (as well as other data points such as user profile information, user login information and the like) of the first and second user. Thus, the annotating proxy server can maintain a database of users in order to generate an implied social network (e.g. with user profile information). In step 308, if there are greater than n edges (i.e. connections) between the first and second user, the annotating proxy server can then provide permission for another module of the annotating proxy server to integrate information about and/or provided by the second user to generate a second web page that substantially include aspects of the first web page, information about the first user and/or information about the second user in step 310. If there are less than n edges between the first and second user, the annotating proxy server can then deny permission to this information in step 310.

Figure 4A:
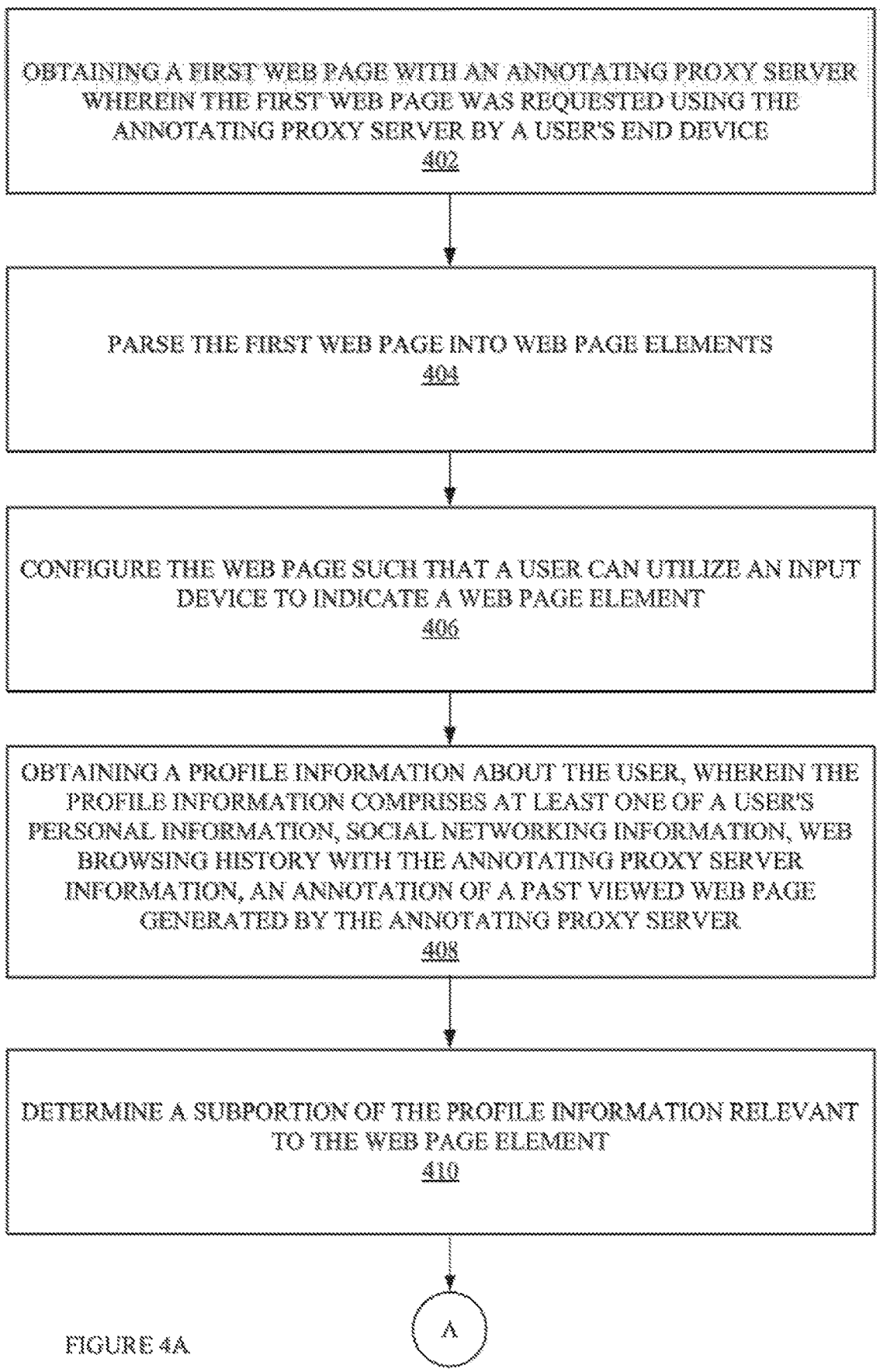
FIGS. 4A-B illustrates another exemplary process for annotating a web page with an annotating proxy server.
Figure 4B:
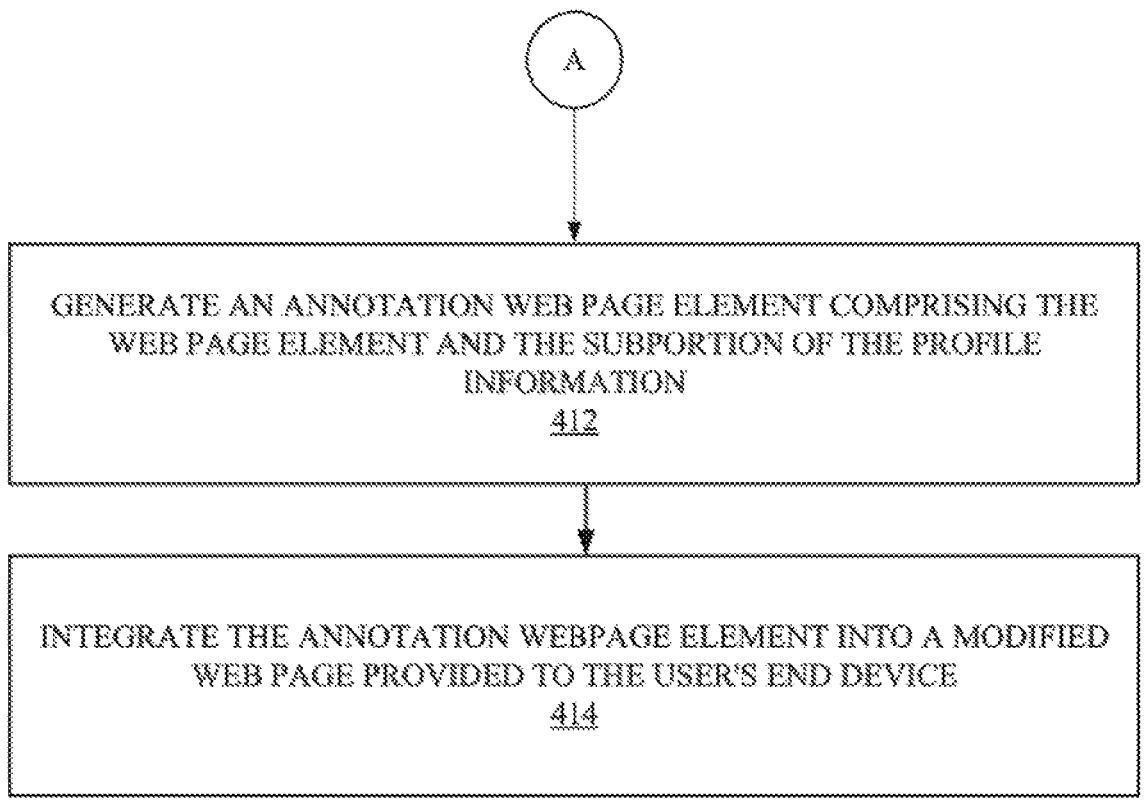

FIGS. 4A-B illustrate another exemplary process 400 for annotating a web page with an annotating proxy server. In step 402 of process 400, a first web page is obtained with an annotating proxy server. The first web page can be requested by a user's end device (a web browser in a computing device such as a personal computer, a laptop, a tablet computer and/or a smartphone). Optionally, the request to the annotating proxy server can include user information (as obtained by a module in the end device). Moreover, user information can be collected by the annotating proxy server (e.g., registration information, user history using the annotating proxy server, user interactions with other members of a social network such as one maintained by the annotating proxy server, etc.). In step 404, the web page can be parsed into elements (e.g. such as those delimited by HTML, XHTML, XML and/or similar other markup languages). The annotating proxy server can include a parser module. In step 406, the web page can be configured such that the user can utilize an input device to indicate a web page element (e.g. a portion of a web document the user wishes to annotate). In step 408, a user's profile information is obtained. The user's profile information can include information about the user and/or the user's behavior in the annotating proxy server system. For example, user's profile information can include such information as user's personal information, user's web browsing history (for a specified period of time), related social networking information, user's past modifications/annotations of web pages with the annotating proxy server, user comments about the indicated web element, user's social networking 'friends' comments about the indicated web element, and the like. The user can be the user requesting the web page. In step 410, a subportion of the user's profile information that is relevant to the indicated web page element (e.g. as determined by a meaning of the web, page element and/or a meaning of the subportion) is determined. Step 410 can be performed by tables that match categories of web page elements with categories of user's profile information, comparison algorithms, etc. In step 412 of process 400, an annotation web page element is generated. The annotation web page element can include the indicated web page element (e.g. a modified version of the HTML code (or other markup language) that is readable by a web browser that is compatible for integration with HTML code that generates the annotation that includes the relevant user profile information. In step 414, the annotation web page element and be integrated into a modified web page that is provided to the user's end device. Step 412 can be performed by the annotating proxy server.

The annotated web page can be stored by the annotating proxy server in a database and provided to other users of the annotating proxy server. Optionally, a timestamp that provide time of annotation can be associated with the annotated web page. The various user annotations can be removed from the annotated web page after a specified period of time.

In some embodiments, the annotated web page and/or annotations can also include commercials with hyperlinks offered by third party advertisers. Furthermore, annotations related to other users can optionally include fields for input by a viewing user. Input can include comments, hyperlinks, media and/or any combination thereof. The proxy server can notify a user that originally generated the annotation (e.g. via text message and/or email) if another user inputs comments into the annotation.

Example Recursive Search Processes

Figure 5:
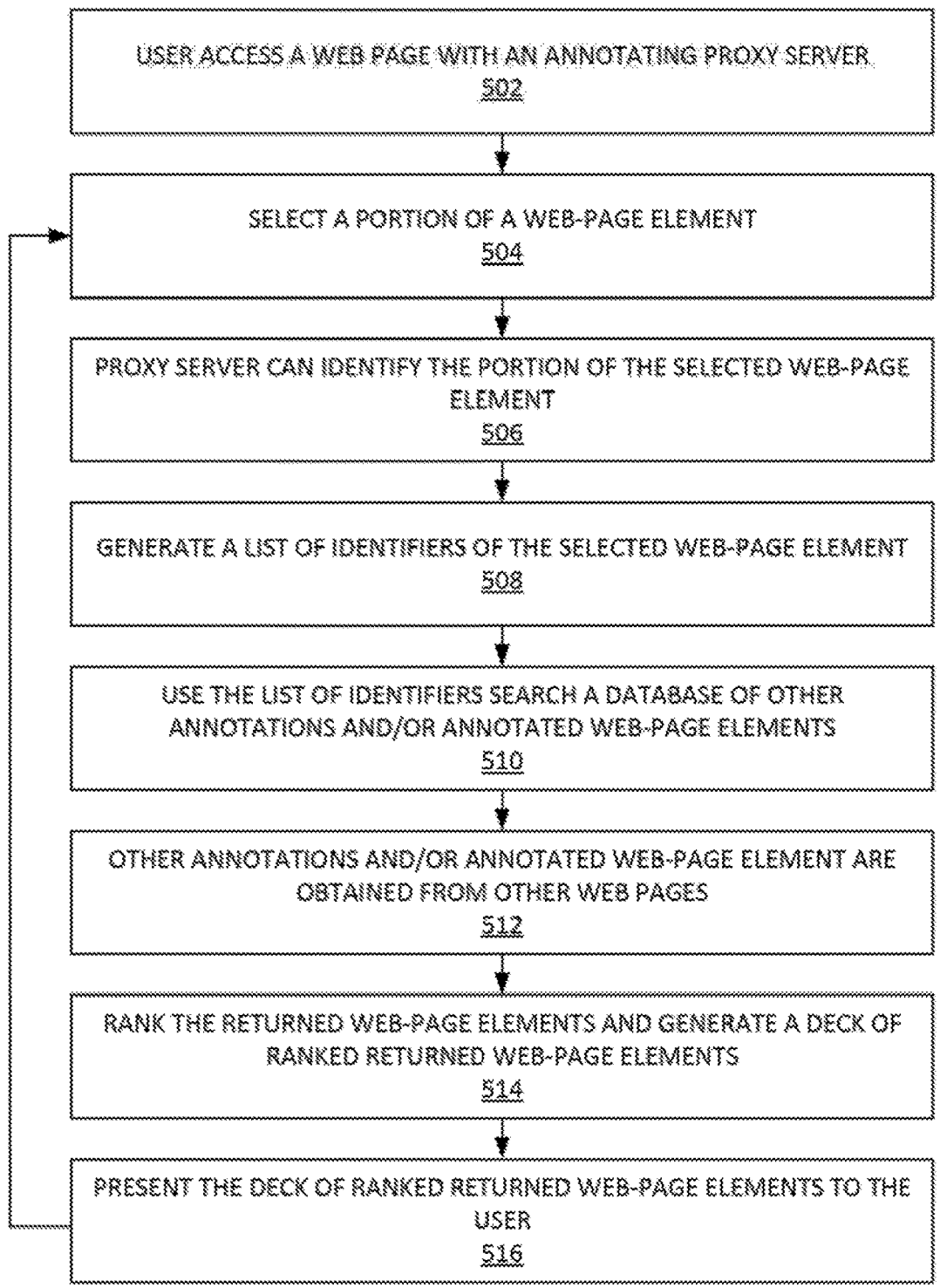
FIG. 5 illustrates an example recursive search process of selectable web-page elements of composite web page elements with an annotating proxy server, according to some embodiments.

FIG. 5 illustrates an example recursive search process 500 of selectable web-page elements of composite web page elements with an annotating proxy server, according to some embodiments. A user can access a web page in step 502. For example, a user can use a web browser operating in a computing system communicatively coupled with a computer network and/or an application browser (e.g. as part of a mobile-device application) to access web page. The user can access the web page via a proxy server.

It is noted that virtual-reality (VR) environment elements, augmented-reality elements, etc. can be accessed in lieu of a web page in some example embodiments. The web page can include digital images and/or text. A user can select and/or move other graphical user interface elements (e.g. a pointer, a region of a touch-screen, body-position sensor wearables that enable a user to interact with VR elements, etc.). This information can be communicated to the proxy server. In this way, the proxy server can monitor the user's interactions with the web page and the various web-page elements. The web page and/or web-page elements can be associated with annotations (e.g. user comments/webpage annotations). FIGS. 1-4 provide various methods of web-page annotations that can be utilized herein.

A user can select a portion of a web-page element in step 504. The proxy server can identify the portion of the selected web-page element in step 506. The proxy server can then generate a list of identifiers of the selected web-page element in step 508. This list of identifiers can be obtained via various methods including, inter alia: computer vision, image identification algorithms, annotation/comment content, the identity of other web-page elements that are proximate to the selected web-page content, the identity of other web-page elements that are referring to the selected web-page content, past user search history, user location, other user attributes, etc.

The proxy server can use the list of identifiers search a database of other annotations and/or annotated web-page elements (e.g. digital images, text elements, digital video, VR elements, etc.) in step 510. The other annotations and/or annotated web-page element can be obtained from the other web pages accessible by the proxy server in step 512. The proxy server can then determine attributes of the returned web-page elements that are similar to the user selected-portion of the web-page element. The proxy server can rank the returned web-page elements based on various factors such as, inter alia: similarity to the user selected-portion of the web-page element, user attributes, user search history, user location, popularity of annotations by other users, etc. in step 514.

In step 516, the ranked deck of web-page elements can be presented to the user. For example, the proxy server can obtain files/documents that contain the web-page elements (e.g. portions of a web page, digital image, video file, portion of a text documents, etc.). The proxy server can generate a deck of ranked web-page elements.

The deck of ranked web-page elements can be presented to the user as a series of slides each slide including a ranked web-page element that can be search by having a portion selected. For example, the currently viewed web page can be modified to include the deck of ranked web-page elements. The deck of ranked web-page elements can be navigable by the user. For example, a user can scroll through the deck of ranked web-page elements. A user can then select a portion of a particular slide in the deck of ranked web-page elements.

All or portions of process 500 can be repeated when the user selects web-pages elements of the deck of ranked web-page elements. Each selection of a web-pages elements of the deck of ranked web-page elements can cause process 500 to generate a sub-deck of ranked web-page elements. The content and ranking of the original deck of ranked web-page elements can be regenerated when a user selects web-pages elements of a sub-deck of ranked web-page elements. In this way, process 500 can include a recursive search aspect. Process 500 can also be iterative in that a user can be presented with iterations of sub-decks of ranked web-page elements for each selected web-page element.

Figure 6:
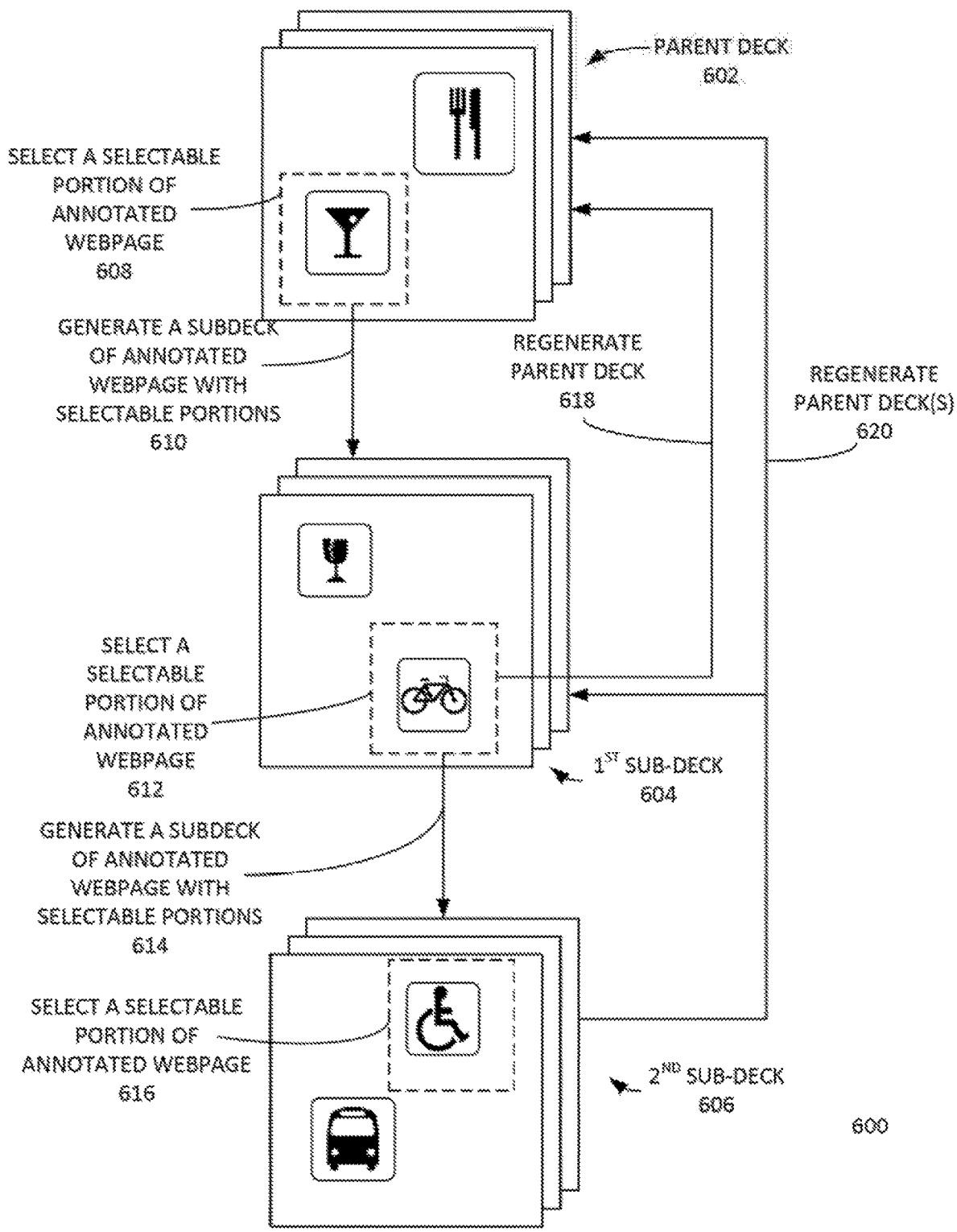
FIG. 6 illustrates an example recursive search process, according to some embodiments.

FIG. 6 illustrates an example recursive search process 600, according to some embodiments. Process 500 can be used to generate a parent deck 602. Parent deck 602 can be a ranked deck of web-page elements can be presented to the user. A user can scroll through and/or otherwise review the individual web-page elements of parent deck 602 (e.g. as slides). The web-page elements of the various slides can be from a plurality of annotated web pages (e.g. such as those generate by the system of FIG. 8 infra).

Select a selectable portion of annotated webpage (and/or web-page elements) present in a slide of a parent deck 602. The selection can trigger the generation of a sub-deck 604 in step 610.

Sub-deck 604 can be a sub-deck of annotated webpage with selectable portions 608. In step 612, a user can select a selectable portion of an annotated webpage (and/or web-page element) present in a slide of sub-deck 604. Accordingly, in an iterative process, in step 614, process 600 can generate another sub-deck 606 of slides of annotated web-pages (and/or web-page elements) with selectable portions. Additionally, in a recursive process, process 600 can re-generate (e.g. modify, re-rank, etc.) the parent deck 602 in step 618. The modification can be based on additional information obtained from the attributes of the selectable portion 612.

Again, in step 616, a user can select a selectable portion of annotated webpage (and/or web-page elements). In step 620, in a recursive process, process 600 can re-generate (e.g. modify, re-rank, etc.) the parent deck 602 and sub-deck 604. The modification of parent deck 602 and sub-deck 604 can be based on additional information obtained from the attributes of the selectable portion 618. Although not shown, process 600 can create further subdecks as well.

Figure 7A:
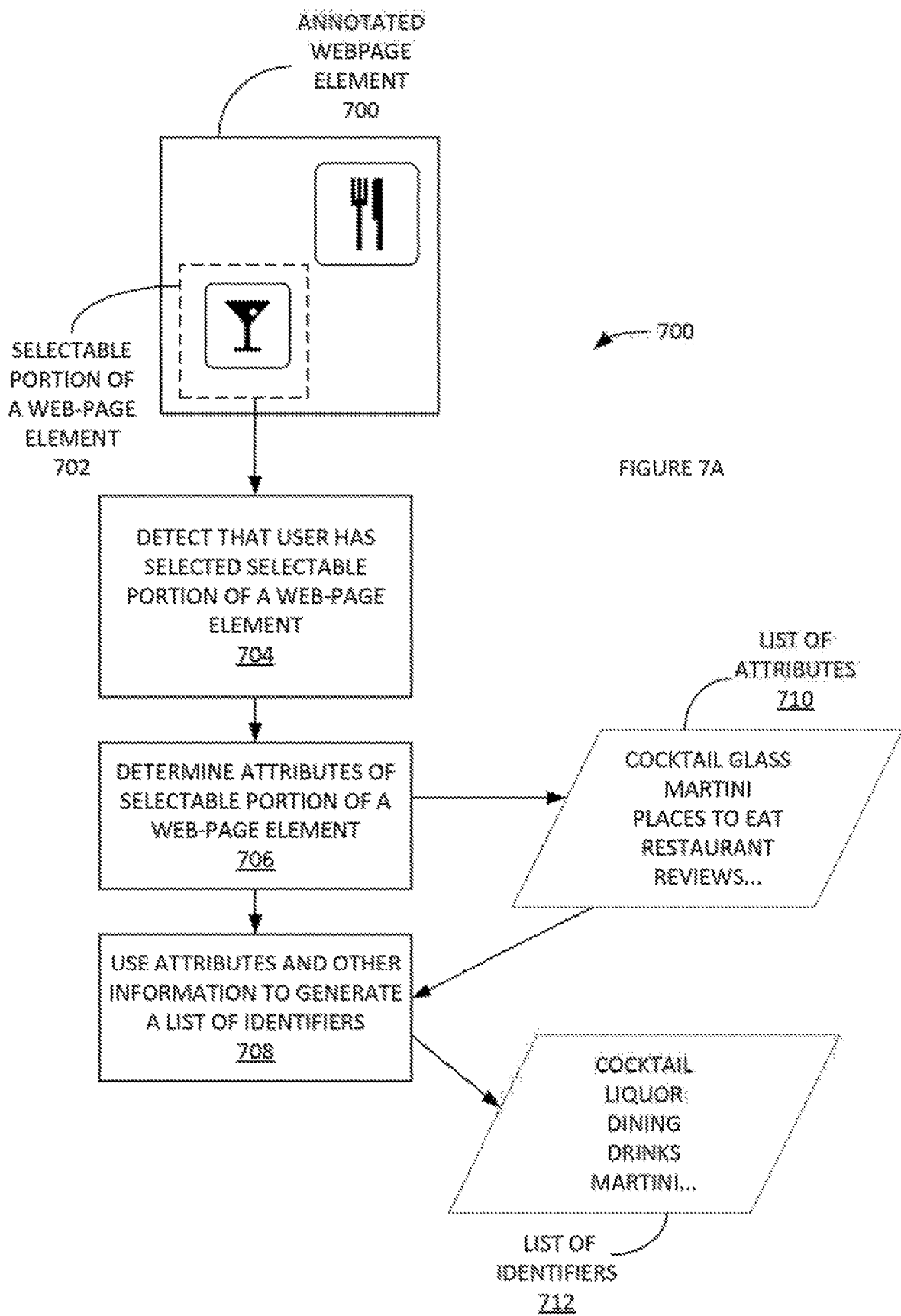
FIGS. 7A-B illustrate an example process of generating of identifiers to be utilized in a recursive search process, according to some embodiments.
Figure 7B:
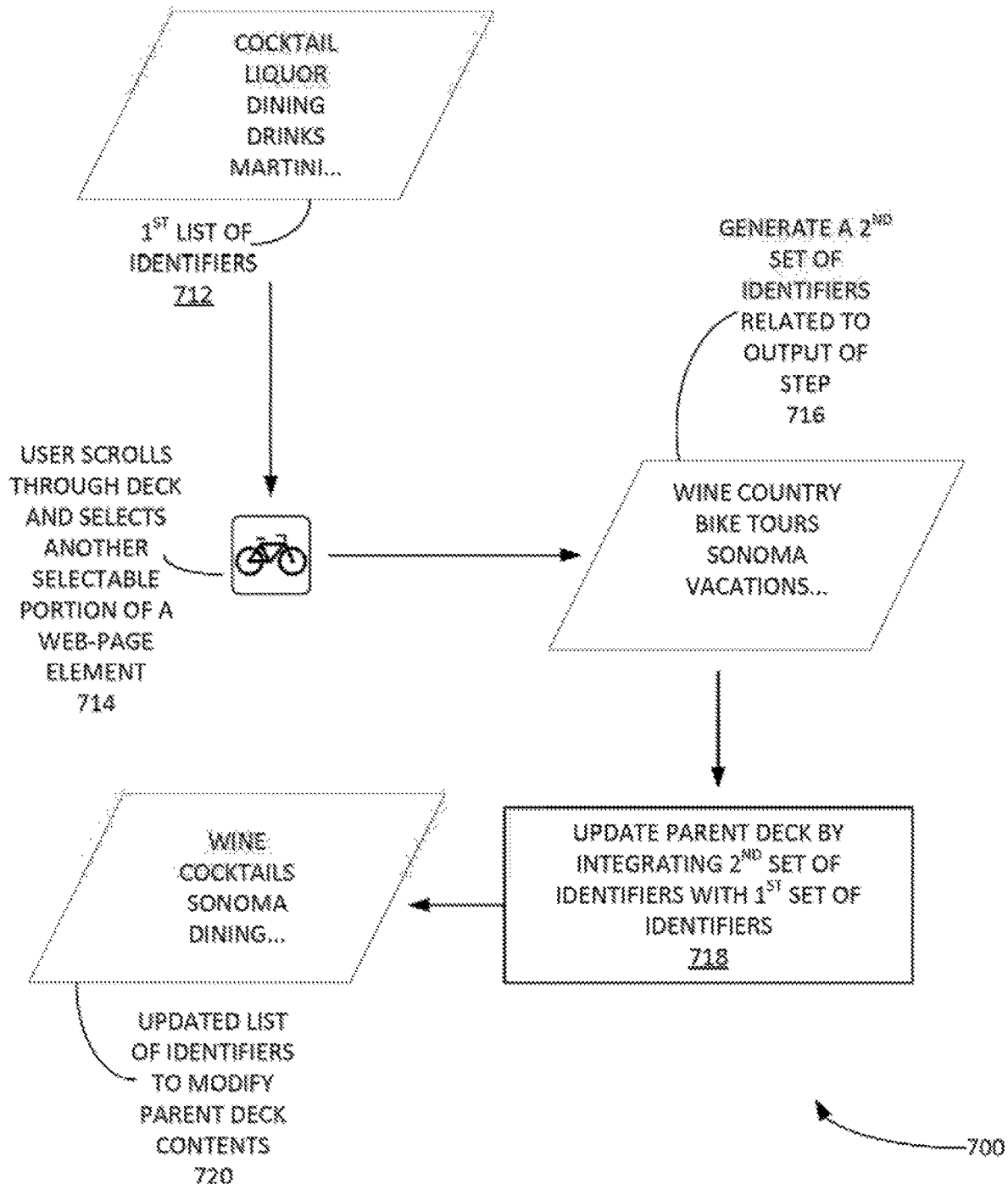

FIGS. 7A-B illustrate an example process of generating a list of identifiers to be utilized in a recursive search process, according to some embodiments. In step 704, process 700 can detect that user has selected selectable portion of a web-page element 702. For example, an annotated webpage can include executable code (e.g. ECMAScript code, etc.) that enables process 700. For example, the executable code can communicate an electronic message to a proxy server that includes information about selected selectable portion of a web-page element 702, annotations associated with web-page element 702, alt-tags associated with web-page element 702, information about the annotated page, etc. when the user uses a computer input system to make a selection.

In step 706, process 700 can determine the attributes of selectable portion. An attribute can be derived from image recognition methods; alt-tags associated with a digital image; nearby text; topics of web page, etc. For example, web-page element 702 is a digital image of a martini cocktail. In the present example, process 700 can then generate the following attribute list 710: cocktail glass (from image recognition), martini (from an alt-tag associated with the image), places to eat (from nearby text to image), restaurant reviews (from topic of web page that includes web page element 702), etc. In step 708, process 700 can use the attributes list 710 and/or other information (e.g. user history, annotated content of annotations associated with web page element 702, etc.) to generate a list of identifiers. An identifier can be identical to an attribute. For example, the list of attributes can be ranked based on various factors such as, inter alia: means used to determine identifier (e.g. image recognition can be weighted greater than alt-tags; alt-tags can be weighted greater than web-page topic, etc.); user attributes (e.g. user has an interest in cocktails so 'martini' weighted greater than 'restaurant reviews', etc.); parent deck and/or parent sub-deck topics can be weighted greater than topics not related to parent deck topics; etc. An identifier list 712 can then be generated, for example: cocktail, liquor, dining and drinks, martini, etc. In one example, processes 500, 600 and/or 700 can be implemented by graphical representation module 810 of system 800 discussed infra.

Process 700 can use the first list of identifiers 712 to generate an updated list of identifiers to recursively modify a parent deck. For example, in step 714, a user can scroll through the parent deck and select another selectable portion of a web-page element. In step 716, process 700 can generate a second set of identifiers related to output of step 714. In step 718, process 700 can update the parent deck by integrating second set of identifiers with the first set of identifiers to generate an updated set of identifiers used to populate the parent deck. Element 720 illustrates an updated list 720 of identifiers to modify parent deck contents (e.g. as search terms of the database of annotated web pages managed by the proxy server).

System Architecture

Figure 8:
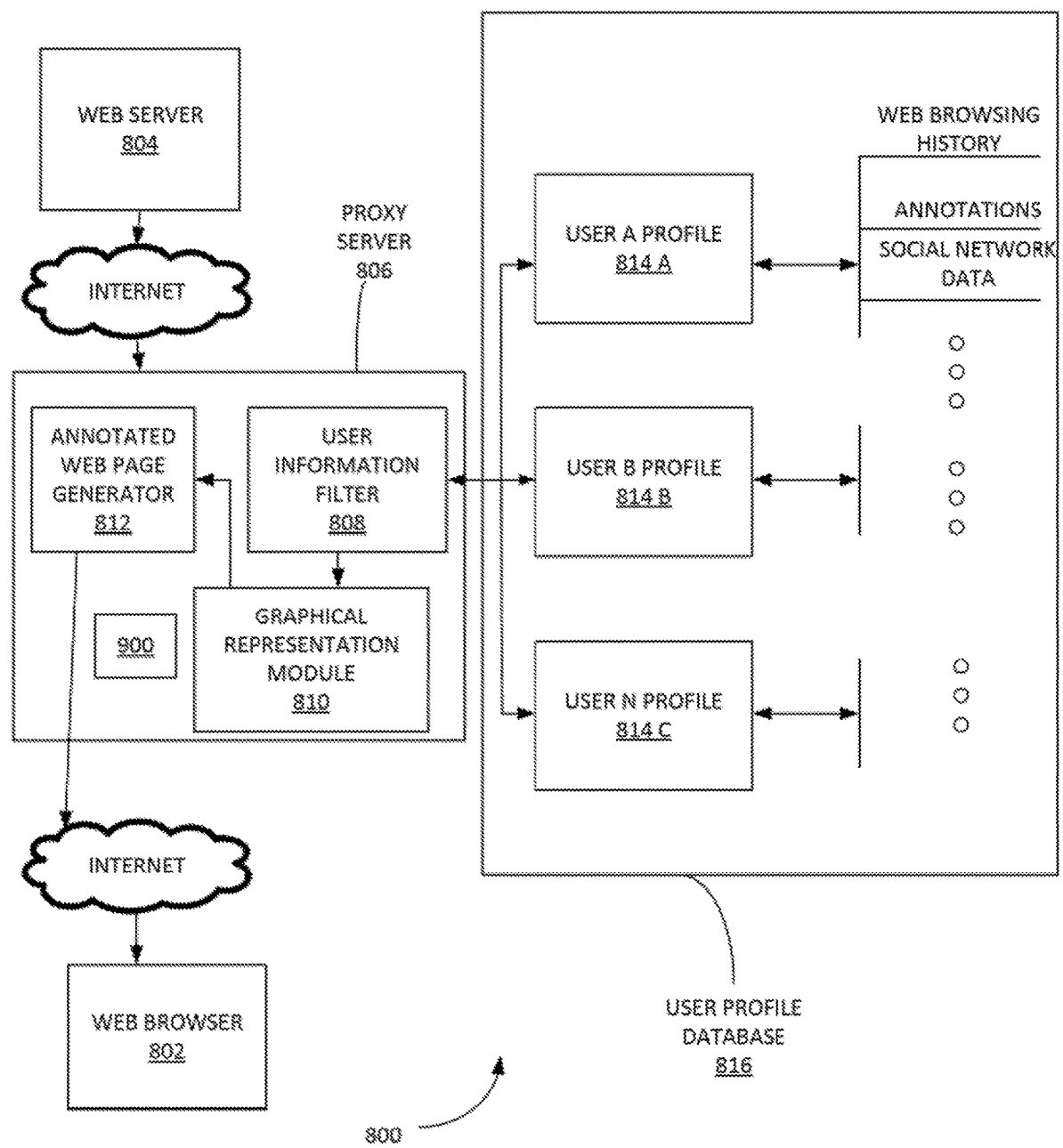
FIG. 8 illustrates an example annotating proxy server system, according to some embodiments.

FIG. 8 illustrates an example annotating proxy server system 800 for implementation of certain embodiments of FIGS. 1-7. Annotating proxy server stem 800 can receive a request from a web browser 802 to retrieve a web page from a third-party web server 802. Annotating proxy server system 800 can include a proxy server 806. Proxy server 806 can typically include a computer system and/or an application that acts as an intermediary for requests from clients (user devices and applications therein such as web browser 802) seeking resources from other servers (e.g. web servers in the Internet). A client can connect to proxy server 806, request some service, such as a file, connection, web page, or other resource, available from a different server such as web server 804. Proxy server 806 can evaluate the request according to its filtering rules. For example, it may filter traffic by interne protocol (IP) address or protocol. If the request is validated by the filter, the proxy provides the resource by connecting to the relevant server and requesting the service on behalf of the client. A proxy server may optionally alter the client's request or the server's response, and sometimes it may serve the request without contacting the specified server. In this case, it 'caches' responses from the remote server, and returns subsequent requests for the same content directly.

In addition to filtering the client's requests by IP address and other protocols, proxy server 806 can modify the results of the requests to include annotations of elements of the requesting user's profile. These elements can be relevant to aspects of the web page such as those indicated by the user. Optionally, proxy server 806 can modify the results of the requests to include annotations of relevant elements other users' profiles as well. These other users can be connected to the user via an explicit and/or implied social network. Proxy server 806 can also update profiles of various users based on indications by the indications and/or modifications of the web page initiated by the user. Proxy server 806 can include a registration module (not shown) whereby users can create accounts and register with the annotating proxy server system 800. In some embodiments, proxy server 806 can perform a role similar to a network switch in linking two networks. In this way, proxy server 806 can serve as a gateway to a local proprietary network, of which the users are members, to the Internet.

For example, proxy server 806 can include a user information filter 808 that accesses a user profile database 816 to acquire user profile information from algorithmically selected of user profiles 814 A-C (e.g. from the requesting user's profile, from requesting user's social network connections profiles, etc.). As discussed supra, various criteria can be utilized to determine the selected user profiles such as proxy server general settings, requesting user settings (e.g. a user can modify settings of proxy server 806 to only provide annotations that include specified user profile information and the like). Information acquired by user information filter 808 can be provided to a graphical representation module 810. Graphical representation module 810 can generate a graphical representation of the user profile information. For example, graphical representation module 810 can utilize a common set of graphical elements for a social network and/or obtain graphical elements of the web page. These elements can be modified to include the relevant user profile information obtained by user information filter 808. Optionally, user information filter 808 can also filter user profile information by other parameters such as regency of information input, location of user, user demographics, etc.).

Annotated web page generator 812 can integrate the graphical representation of the user profile information with web page elements into web page annotations. For example, annotated web page generator 812 can include a server-side scripting engine that takes the code and other data that makes up the web page and the user profile information. For example, annotated web page generator 812 can utilize server-side scripting language originally designed for web development to produce dynamic web pages. Annotated web page annotations can include attributes of both the web page element and the user profile information. Optionally, annotated web page annotations can also include attributes of recently visited web pages as well. It should be noted that data utilized by the proxy server 806 can be stored in a cache (e.g. in server data store 608 of FIG. 6 infra) for later use. In some embodiments, proxy server 806 can include recursive search module 900 as provide infra.

Figure 9:
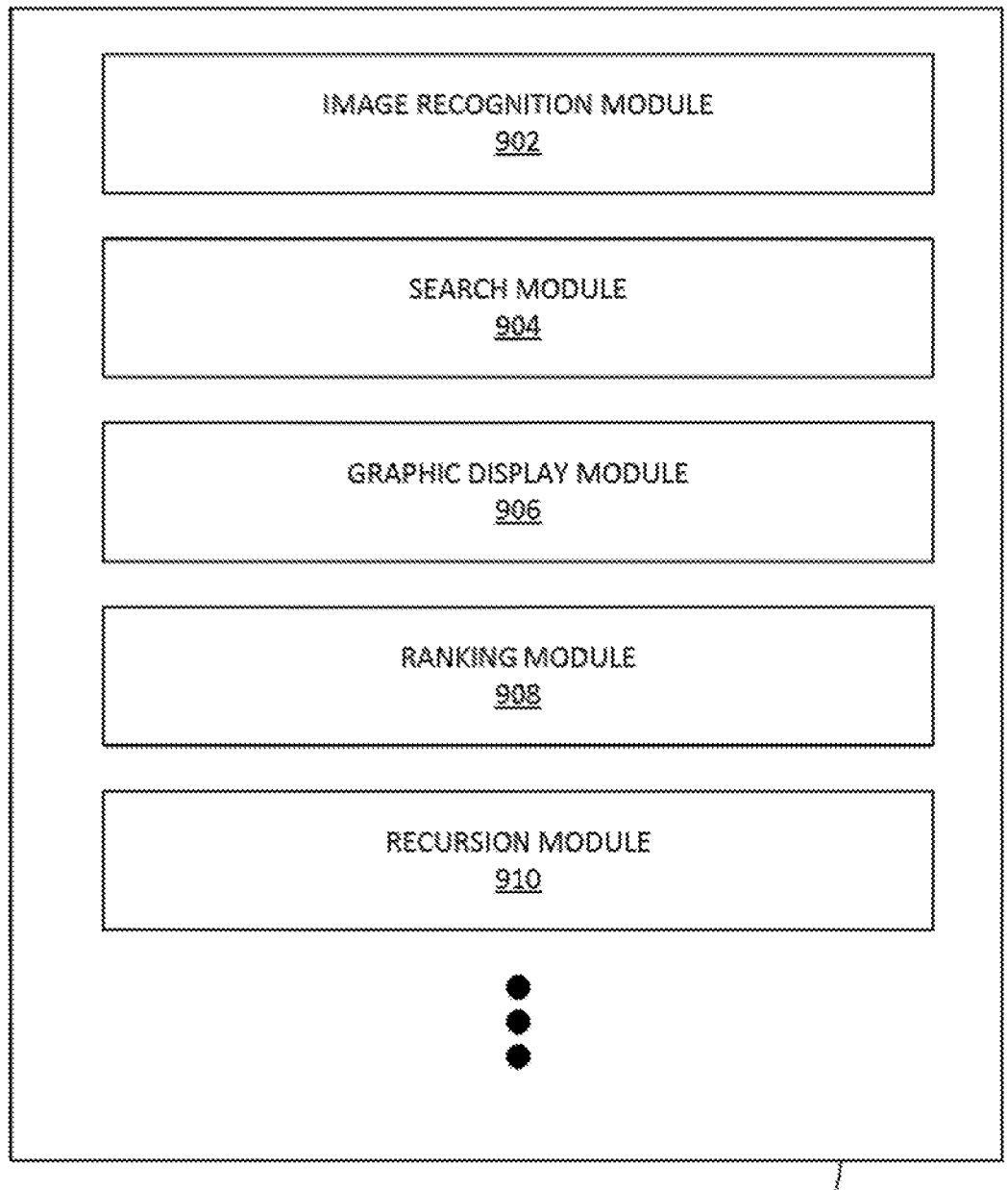
FIG. 9 illustrates an example recursive search module, according to some embodiments.

FIG. 9 illustrates an example recursive search module 900, according to some embodiments. Recursive search module 900 can implement processes 500-600 and/or 700. Recursive search module 900 can include various computer-vision functionalities, ranking engines, linguistic analysis systems, semantic similarity analysis modules, statistical analysis modules, graphics editors, web servers, database managers, optical character recognition modules, etc. In one example system 900 can be implemented in graphical representation module 810 of system 800 discussed supra.

In some embodiments, recursive search module 900 can include image recognition module 902. Image recognition module 902 can recognize/identity various images in digital images/videos with various object recognition algorithms. For example, a user can select (e.g. with a mouse pointer, with a touch-screen action, etc.) a portion of a digital image displayed in an annotated web page. Image recognition module 902 can identify the portion of the image using an object recognition algorithm. Image recognition module 902 can use other processes to identify selected elements including, inter alia: alt tags (e.g. an alt attribute is used in HTML and XHTML documents to specify alternative text, etc.), inference engines, examinations of markup text, annotation content analysis, etc.

In some embodiments, recursive search module 900 can include search module 904. Search module 904 can generate identifiers and/or other search terms for the output of image recognition module 902. Search module 904 can then search various databases of selected web-page elements (e.g. a database of annotated webpage managed and maintained by system 800, etc.).

In some embodiments, recursive search module 900 can include graphic display module 906. Graphic display module 906 can include graphic editors that generate a view of ranked selectable web-page elements (e.g. as a deck of slides, a series of image tabs, a list of videos, etc.). Graphic display module 906 can modify the view of ranked selectable web-page elements for presentation in a web browser (e.g. overlaying an annotated web page) or in a mobile-device application.

In some embodiments, recursive search module 900 can include ranking module 908. Various scoring and/or ranking processes can be utilized. For example, process 900 can use a combination of query-dependent and query-independent methods to rank the results of an expected relevance to an identifier search query. Query-independent methods can measure the estimated importance of an annotated web-page and/or web-page element independent of any consideration of how well it matches the specific query. Query-independent methods can take into account a user's attributes, annotation history, past search history, etc. Query-dependent methods can measure the degree to which an annotated web-page and/or web-page element matches a specific query, independent of the importance of the page. Query-dependent ranking can be based on heuristics that consider the number and locations of matches of the various query words in the searchable annotations associated with various annotated web-page and/or web-page elements, alt-tags associated with the searchable annotated web-page and/or web-page elements, searchable anchor text referring to the annotated web-page and/or web-page elements, etc.

In some embodiments, recursive search module 900 can include recursion module 910. Recursion module 910 can manage the updating of parent view of ranked, selectable web-page elements based on the selected web-page elements within said views. Recursion module 910 can also maintain a record of historical lists of ranked selectable web-page elements. In some embodiments, a user can also scroll through historical ranked selectable web-page elements. For example, these can also be formatted as a deck, list or other arrangement.

Figure 10:
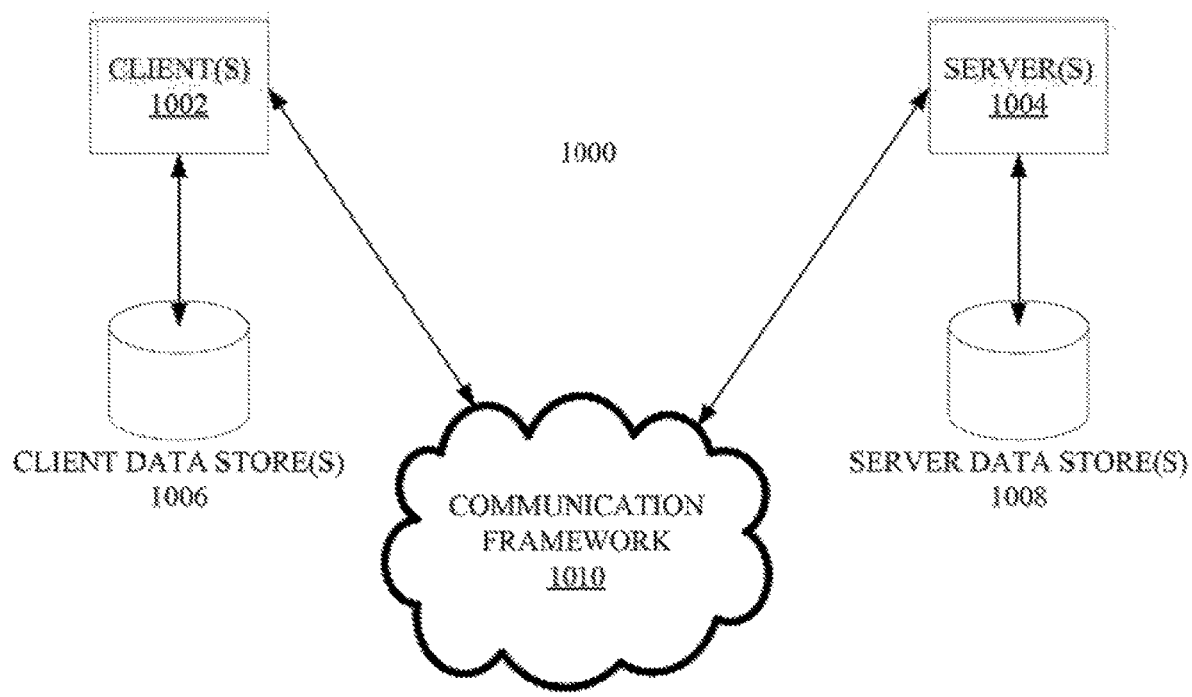
FIG. 10 illustrate a sample-computing environment which can be utilized in some embodiments.

FIG. 10 illustrates a sample-computing environment 1000 which can be utilized in some embodiments. The system 1000 further illustrates a system that includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). One possible communication between a client 1002 and a server 1004 may be in the form of a data packet adapted to be transmitted between two or more computer processes. The system 1000 includes a communication framework 1010 that can be employed to facilitate communications between the client(s) 1002 and the server(s) 1004. The client(s) 1002 are connected to one or more client data store(s) 1006 that can be employed to store information local to the client(s) 1002. Similarly, the server(s) 1004 are connected to one or more server data store(s) 1008 that can be employed to store information local to the server(s) 1004.

Figure 11:
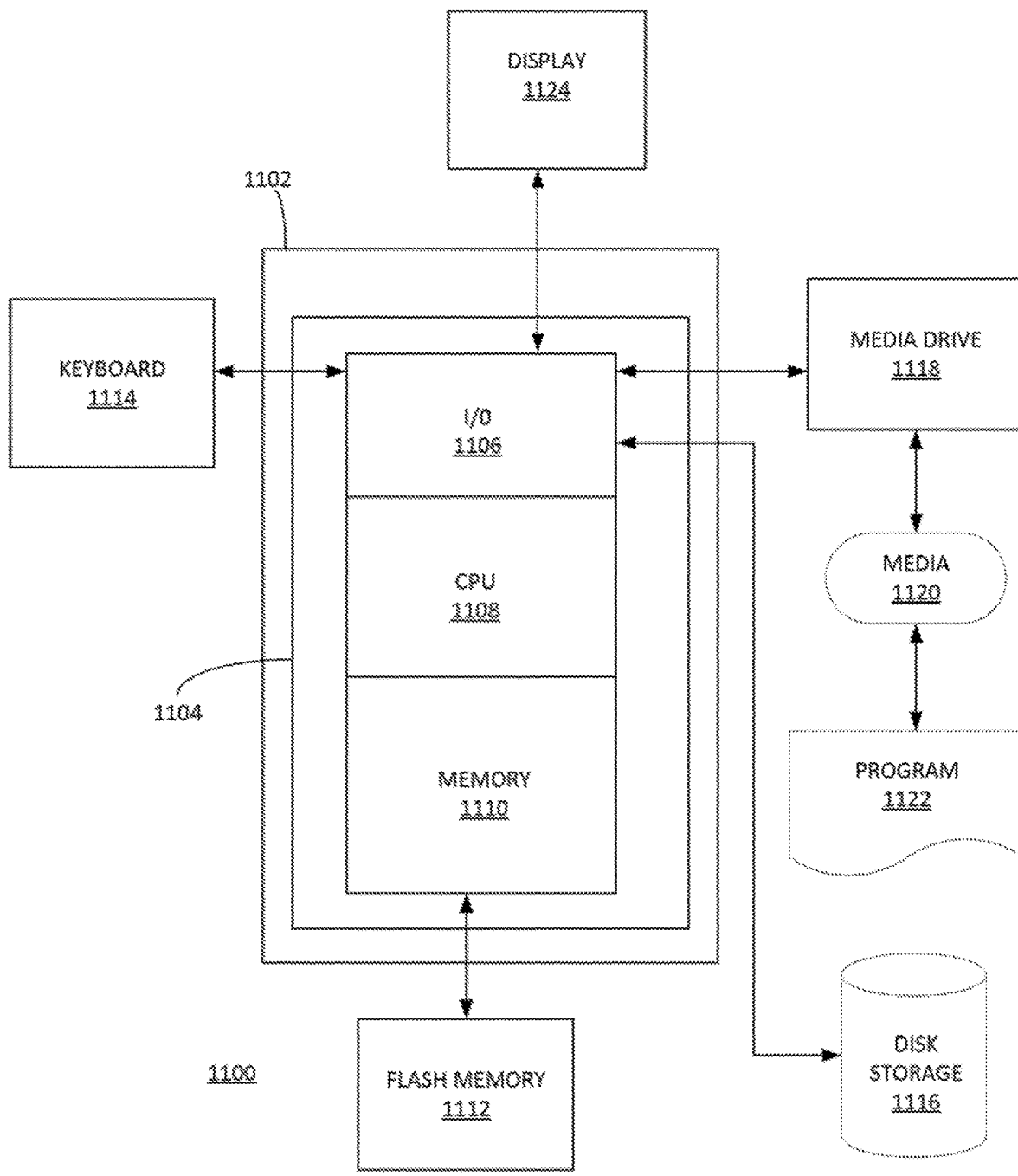
FIG. 11 illustrates an exemplary computing system which can be configured to implement aspects of some embodiments.

FIG. 11 depicts an exemplary computing system 1100 that can be configured to perform any one of the above-described processes. In this context, computing system 1100 may include, for example, a processor, memory, storage, and I/O devices (e.g., monitor, keyboard, disk drive, Internet connection, etc.). However, computing system 1100 may include circuitry or other specialized hardware for carrying out some or all aspects of the processes. In some operational settings, computing system 1100 may be configured as a system that includes one or more units, each of which is configured to carry out some aspects of the processes either in software, hardware, or some combination thereof.

FIG. 11 depicts computing system 1100 with a number, of components that may be used to perform the above-described processes. The main system 1102 includes a motherboard 1104 having an I/O section 1106, one or more central processing units (CPU) 1108, and a memory section 1110, which may have a flash memory card 1112 related to it. The I/O section 1106 is connected to a display 1124, a keyboard 1114, a disk storage unit 1116, and a media drive unit 1118. The media drive unit 1118 can read/write a computer-readable medium 1120, which can contain programs 1122 and/or data.

Additional Use Cases and Examples

In some embodiments, a user can modify and/or create web-page elements for use in the methods and/or systems provided supra. For example, a user can select portions of a web-page element for selecting the identifiers.

In another example, a user can select portions of a web-page element that indicate that identifiers from these selected portions are to have a greater weight than other identifiers derived from non-selected portions of the web-page elements. For example, an image can be decomposed into hierarchal layers. The particular hierarchal order of each image portion can be indicated by the user. Each hierarchal layer can be used to generate a weight of an identifier derived from the portion of the web-page element in the layer. For example, a user can select an image of a band. The user can indicate that the guitar and drums in the image belong to a top hierarchal layer. Identifiers derived from these portions can be weighted greater than identifiers from the rest of the image (e.g. a bass guitar, a singer's identity, etc.).

In one example, a user can 'copy and paste' portions of first web-page element into a second web-page element. The augmented second web-page element can then be utilized to generate a list of identifiers. For example, a user can cut and paste an image of a surf board into a web-page element image of a beach. The list of identifiers generated from the augmented image can include 'surf beaches', 'famous surfers', etc.

In another example, a user can remove various portions of a web-page element and the reduced web-page element can be used to generate a list of identifiers. For example, a web-page element image of a surf board on a beach can be provided. The user can indicate (e.g. via a web-page application that allows the user to modify a digital image) that the surf board is to be removed from the identifier generation step. In some examples, a user can merge two or more web-page elements into a single web-page element to be used for generating a list of identifiers. For example, a user can merge an image of a fire place and another image of a cow. The resulting list of identifiers can include 'cook out recipes', 'barbeques', etc. In yet another example, a user can integrate explicit text instructions to a web-page element. These text instructions can be used, along with information derived from the web-page element, to generate a list of identifiers. For example, a user can select a web-page element image of a beach and then insert the word 'surfer'. Identifiers for beach vacations with surfing can then be generated. Various software functionalities can be utilized to implement these embodiments, include graphics editors, web-page editors, etc.

In some embodiments, randomizers can be used to include randomly selected images, image portions and/or other elements to integrate with one or more user-selected web-page elements. Accordingly, an aggregated web-page element that includes random elements can be used to generate the list of identifiers. The random elements can be taken from a data store (not shown) generated by recursive search module 900. This data store can be populated with various elements obtained from the user's past search history, the user's past annotation history, the user's profile information, other users' past search histories, other users' past annotation histories, etc. In some examples, recursive search module 900 can identify similar users to a user according to various parameters. Web-page elements used by these users for recursive searches can be included in the data store. In still other examples, the data store can include random images and/or text from trending searches for the day or past hour, etc.

In one example, it can be determined that various images tend to cluster to cluster together during particular recursive searches (e.g. a group of images that are often returned as a set for a specified recursive search, etc.). Accordingly, recursive search module 900 can keep past 'paths' (e.g. selected sets of decks and sub-decks) of recursive search decks and/or other search result formats of the user and/or other users and provide these in a user's current recursive search deck.

It is noted that in some examples, recursive search module 900 can include one or more recommendation engines. The recommendation engine can be an information filtering system (e.g. collaborative and/or content-based filtering) that predicts the 'rating' or 'preference' that a user would give to a particular web-page element supplement. The recommendation can take into account a user's preferences, historical recursive search history, annotation history, demographics, location, etc. The recommendation engine can retrieve various supplemental information (e.g. supplemental images, text, etc.) that a user may find useful to include in a recursive search. The recommendation engine can present this supplemental information as a list of selectable items. The user can select one or more items and integrate said items into a web-page element for a recursive search. For example, the recommendation engine can review a user's recent web search history and determine that the user was searching for a particular style of shirt. The user may then utilize systems 800 and 900 to implement a recursive search. The user may select a web-page element of an annotated web page. For example, the user may select an image of a famous actor. The recommendation engine can retrieve the user's recent search history for shirts and provide a ranked list of shirt images for the user to integrate into the image of the famous actor. The selected shirt image(s) and the famous actor's images can then be utilized to initiate a recursive search.

In some embodiments, a loop of, digital images (e.g. a deck) can originally include a particular image. However, the image may become non-available at a later time. Consequently, metadata about the images (and/or videos, text, etc.) that constitute a deck can be maintained. The metadata can describe the content of the image, the subject matter of the image, etc. The metadata can be used to generate a composite substitute image for the non-available image. The composite substitute image can be generated from one or more other similar images and/or elements of similar images. For example, an image of a celebrity can originally populate a deck. However, the image can be lost. A composite substitute image of the celebrity can be constructed from other sources and used as a substitute for the non-available image of the celebrity. It is noted that, in some embodiments, an alt tag or other text resulting from an image recognition process can be stored and made available to users and/or a recursive search system.

In some embodiments, an alt tag as that relates to an application (e.g. a web based application, a mobile-device application, etc.) can be generated. The alt tag can help identify the particular metadata about the application and the context of the application. For example, the alt tag can include information about various changes/modifications to the application. The alt tag can also include information based on the specific use by a specific user for instance. The user's specific use of that application can be viewed, recognized and tagged with any recognized text (e.g. using an OCR program, etc.).

CONCLUSION

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java) or some specialized application-specific language.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computer-implemented method of a proxy-server system comprising:
   detecting that a web browser of a user has accessed an annotated webpage, wherein the annotated webpage comprises one or more webpage elements comprising a set of selectable portions;
   detecting that a user has utilized a user input system to select a selectable portion of a web-page element;
   identifying the selectable portion of the web-page element;
   generating a list of identifiers based on the identity of the selectable portion;
   with the list of identifiers, searching a database of annotated web-page elements managed by the proxy server system;
   retrieving a set of returned annotated web-page elements from the database;
   assigning a similarity score each returned annotated web-page element, wherein the similarity score is based on a similarity of the selectable web-page element with a respective returned annotated web-page element;
   ranking each of the returned web-page elements based on the similarity score;
   creating a deck of ranked-returned web-page elements;
   presenting the deck of ranked-returned web-page element to the web browser of the user, wherein each ranked-returned web-page element comprises another set of selectable portions;
   detecting that the user has utilized the user input system to select another selectable portion of the ranked-returned web-page element;
   identifying the another selectable portion of the ranked-returned web-page element;
   generating another list of identifiers based on the another selectable portion's identity;
   updating the list of identifiers with the another list of identifiers;
   reassigning a similarity score to each returned annotated web-page element;

re-ranking each returned web-page elements based on the similarity score; and re-creating the deck of ranked-returned web-page elements.

2. The computer-implemented method of claim 1, wherein the proxy-server system comprises a cloud-computing implemented proxy server.

3. The computer-implemented method of claim 2, wherein the similarity score of each returned annotated web-page element is further based on a user attribute, a user search-history, and a user location.

4. The computer-implemented method of claim 1, wherein the similarity score of each returned annotated web-page element further based on a popularity of each annotation as accessed by other users.

5. The computer-implemented method of claim 1 further with the another list of identifiers, searching the database of annotated web-page elements managed by the proxy server system; and retrieving another set of returned annotated web-page elements from the database.

6. The computer-implemented method of claim 5 further comprising:

assigning another similarity score to each returned annotated web-page element;

ranking each returned web-page elements based on the another similarity score; and creating a sub-deck of ranked-returned web-page elements.

7. The computer-implemented method of claim 6 further comprising:

presenting the re-created deck of ranked-returned web-page elements to the web browser of the user; and presenting the sub-deck of ranked-returned web-page elements to the web browser of the user.

8. The computer-implemented method of claim 7, wherein the ranked-returned web-page elements comprise one or more digital images.

9. The computer-implemented method of claim 7, wherein the ranked-returned web-page elements comprise one or more digital videos.

10. A computer system for implementing an image search with a proxy-server system, the proxy-server system comprising:

memory configured to store a set instructions used to implement the image search; and one or more processors configured to:

detect that a web browser of a user has accessed are annotated webpage, wherein the annotated webpage comprises one or more webpage elements comprising a set of selectable portions;

detect that a user has utilized a user input system to select a selectable portion of a web-page element;

identify the selectable portion of the web-page element;

generate a list of identifiers based on the identity of the selectable portion; with the list of identifiers, search a database of annotated web-page elements managed by the proxy server system;

retrieve a set of returned annotated web-page elements from the database;

assign a similarity score to each returned annotated web-page element, wherein the similarity score is based on a similarity of the selectable web-page element with a respective returned annotated web-page element;

rank each of the returned web-page elements based on the similarity score;

create a deck of ranked-returned web-page elements;

present the deck of ranked-returned web-page element to the web browser of the user, wherein each ranked-returned web-page element comprises another set of selectable portions;

detect that the user has utilized the user input system to select another selectable portion of the ranked-returned web-page element;

identify the another selectable portion of the ranked-returned web-page element;

generate another list of identifiers based on the another selectable portion's identity;

update the list of identifiers with the another list of identifiers;

reassign a similarity score to each returned annotated web-page element;

re-rank each returned web-page elements based on the similarity score; and re-create the deck of ranked-returned web-page elements.

11. The computer system of claim 10, wherein the proxy-server system comprises a cloud-computing implemented proxy server.

12. The computer system of claim 10, wherein the similarity score of each returned annotated web-page element is further based on a popularity of each annotation; as accessed by other users.

13. The computer system of claim 12, wherein the similarity score of each returned annotated web-page element is further based on a user attribute, a user search-history, and a user location.

14. The computer system of claim 13, wherein the one or more processors configured to:

with the another list of identifiers, search the database of annotated web-page elements managed by the proxy server system; and retrieve another set of returned annotated web-page elements from the database.

15. The computer system of claim 14, wherein the one or more processors configured to:

assign another similarity score to each returned annotated web-page element;

rank each returned web-page elements based on the another similarity score; and create a sub-deck of ranked-returned web-page elements.

16. The computer system of claim 15, wherein the one or more processors configured to:

present the re-created deck of ranked-returned web-page elements to the web browser of the user; and present the sub-deck of ranked-returned web-page elements to the web browser of user.

\* \* \* \* \*